United States Patent [19]

Esper et al.

[11] 3,923,444
[45] Dec. 2, 1975

[54] EXTRUSION DIE

[75] Inventors: Michael J. Esper, Detroit; Louis J. Mitchell, Ypsilanti, both of Mich.

[73] Assignee: Ford Motor Company, Dearborn, Mich.

[22] Filed: May 3, 1974

[21] Appl. No.: 466,651

[52] U.S. Cl. ................. 425/461; 425/382
[51] Int. Cl.² .......................... B29F 3/04
[58] Field of Search ........ 425/380, 382 R, 461, 464; 264/176 R

[56] References Cited
UNITED STATES PATENTS

| | | | |
|---|---|---|---|
| 3,032,008 | 5/1962 | Land et al. | 425/382 X |
| 3,492,692 | 2/1970 | Soda et al. | 425/464 X |
| 3,803,951 | 4/1974 | Bagley | 425/464 X |

*Primary Examiner*—Richard Bernard Lazarus
*Attorney, Agent, or Firm*—William E. Johnson; Keith L. Zerschling

[57] ABSTRACT

An extrusion die is disclosed for forming an extruded article having a plurality of interconnected walls which define small passageways therebetween. The extrusion die is suitable for extruding products which may become substrates for catalytic converters used in automotive exhaust system. The extrusion die includes a plurality of elongated extrusion plates and a device for clamping the plurality of plates in a stacked condition. The elongated extrusion plates are specially formed so that when they are in a stacked condition they are capable of producing the extruded product.

1 Claim, 4 Drawing Figures

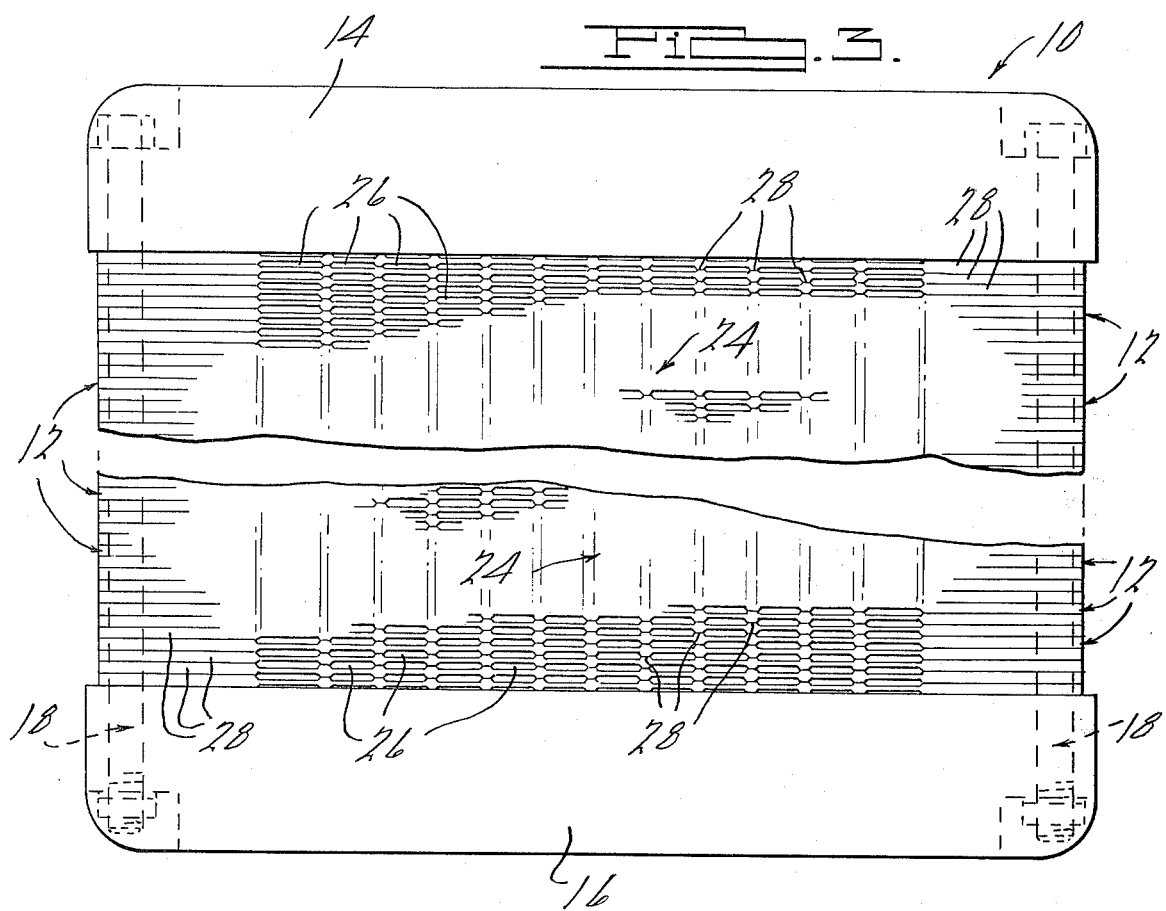
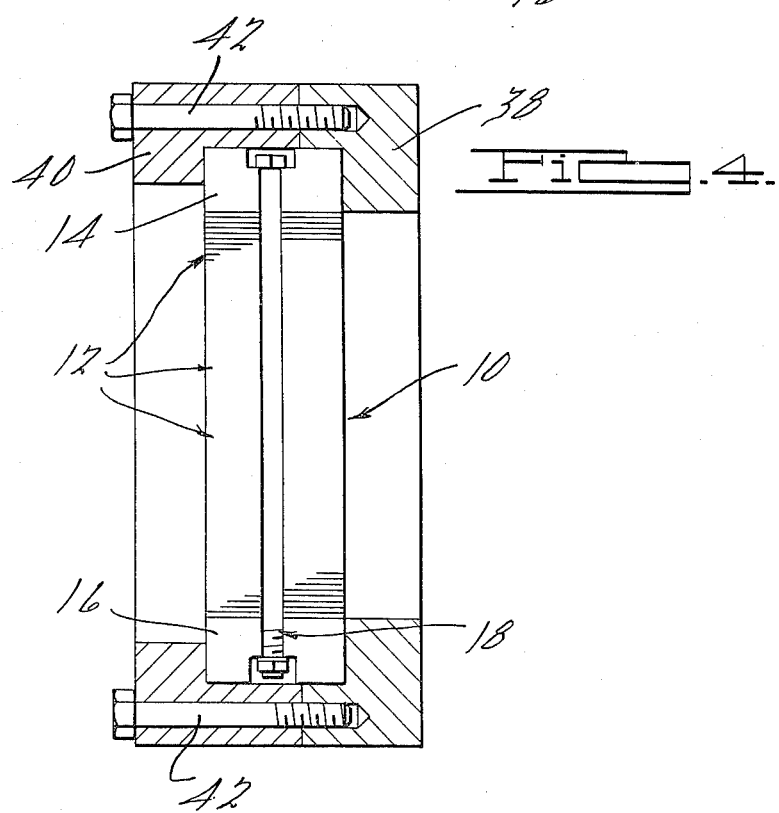

EXTRUSION DIE

BACKGROUND OF THE INVENTION

Catalytic converters are proposed for use in automotive exhaust systems. Generally these converters are located in the exhaust gas line and they consist of a substrate upon which a catalytic material is deposited. The prior art has taught many different methods for making the catalytic substrate including laid up, wrapped, and extruded designs. The extruded type of substrate has been formed on an extrusion die such as taught in German Pat. No. 2,222,468 in which the entire cross-section of the extruded die is machined from a single piece of material. Many other die designs for forming an extruded substrate are also known in the art but in all cases the extrusion die is generally formed from a single piece of material and requires extensive as well as expensive machining operations in order to form the same.

The cost of making a single member extrusion die has generally rendered the manufacturing of extruded substrates too costly and non-competitive with other manufacturing methods. The die manufactured from a single piece of material is also difficult to clean and hard to repair is a small segment thereof is damaged.

SUMMARY OF THE INVENTION

This invention relates to an extrusion die and, more particularly, to an extrusion die for forming an extruded article having a plurality of interconnected walls which define small passageways therebetween. Such an extruded article has particular use as a substrate for a catalytic converter.

The extrusion die of this invention includes a plurality of elongated extrusion plates stacked one upon another. A clamping device holds the plurality of extrusion plates in a stacked condition so that the die may be used in an extrusion press.

Each of the extrusion plates is formed in a particular manner. Each extrusion plate has on both its upper and lower surface thereof a leading edge zone and a trailing edge zone. Recessed areas are formed on the trailing edge zone, which areas of juxtaposed extrusion plates define material feed channels when the extrusion plates are in a stacked condition. Spacing bosses are also formed in at least the trailing edge zone of each plate. These bosses locate juxtaposed extrusion plates so that the recessed areas thereof are spaced apart to define the material feed channels. Finger slots are formed on the leading edge zone of the plate. The finger slots define individual fingers therebetween, the so defined fingers of an extrusion plate having a thickness dimension less than the thickness of the spacing bosses on the upper and lower surfaces of the extrusion plate whereby a space exists between the fingers of juxtaposed extrusion plates. The recessed areas of the extrusion plates defining the feed channels are interconnected with the finger slots and the space between the juxtaposed fingers when the extrusion plates are in a stacked condition. This interconnection permits extrusion material to flow through the feed channels and then through and beyond the finger slota and slots between juxtaposed fingers in order to form the extruded article having a plurality of interconnected walls defining passageways therebetween.

BRIEF DESCRIPTION OF THE DRAWINGS

FIG. 3 is a rear elevation view of the die of FIG. 2.

FIG. 4 is a side elevation view, in cross-section, of the die of this invention installed in a portion of an extrusion press.

DESCRIPTION OF THE PREFERRED EMBODIMENT

CONSTRUCTION

Figure 1:
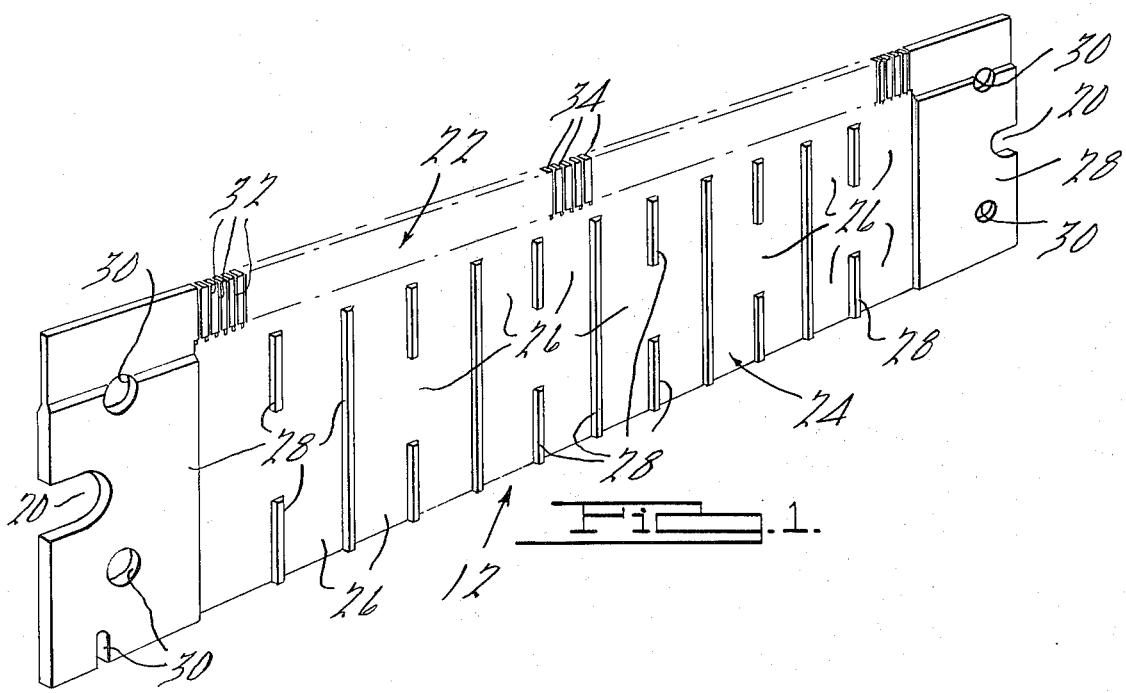
FIG. 1 is a perspective view of one surface of an extrusion plate for the extrusion die of this invention.

In the drawings, the extrusion die of this invention is generally identified by the numeral 10. The die is formed from a plurality of elongated extrusion plates, generally identified by the numeral 12 and best seen in FIG. 1. These extrusion plates, in a number required to form the part of a preset dimension, are stacked in a clamping structure which includes an upper clamping member 14 and a lower clamping member 16. These clamping members are secured together at opposite ends thereof by clamping nuts and bolts assemblies generally identified by the numeral 18. The bolts of the assemblies pass through openings 20 in opposite ends of the extrusion plates 12.

Figure 2:
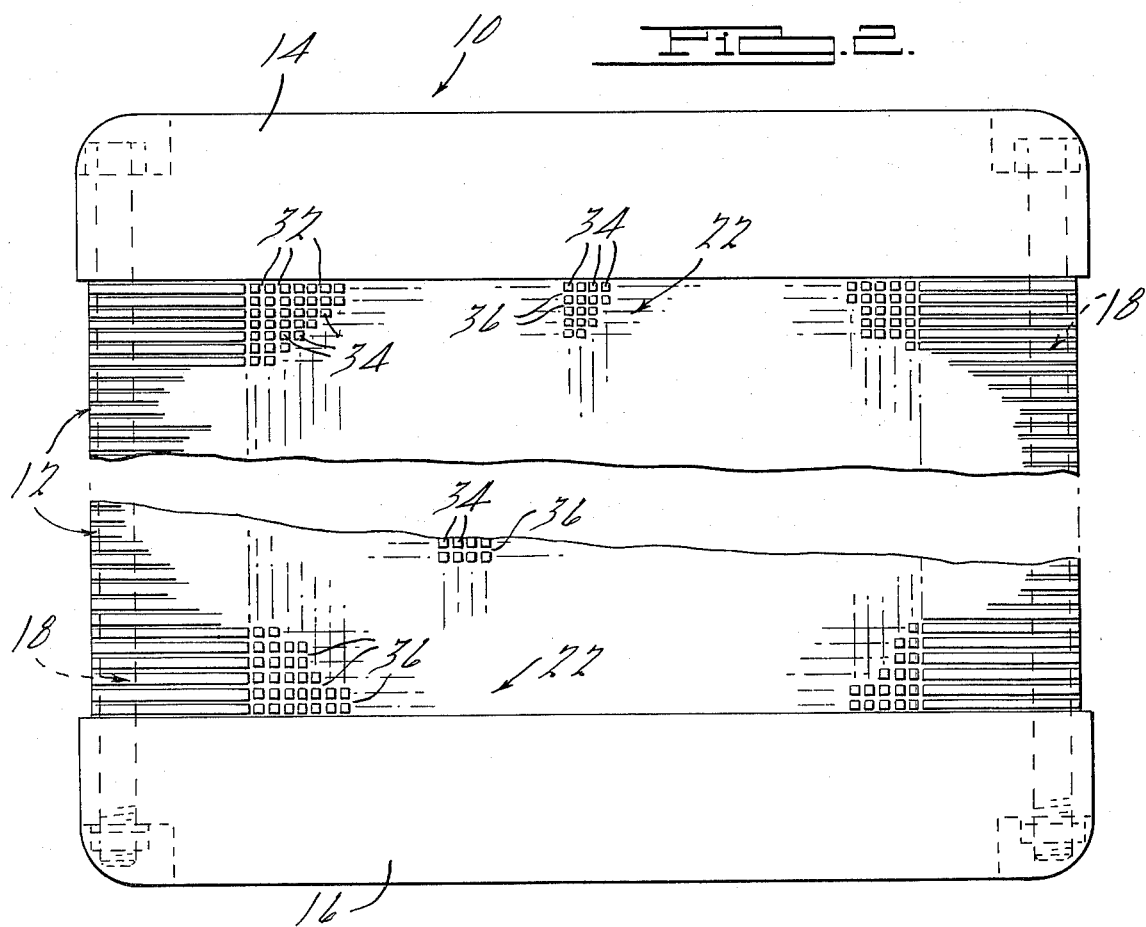
FIG. 2 is a front elevation view of the extrusion die.

As is best seen by referencing FIGS. 1, 2 and 3, each of the extrusion plates 12 have on upper and lower surfaces thereof a leading edge zone, generally identified by the numeral 22 and a trailing edge zone, generally identified by the numeral 24. Recessed areas 26 are formed on the trailing edge zone as best seen in FIG. 1. As best seen in FIG. 3, these recessed areas form material feed channels when the extrusion plates are stacked together.

Spacing bosses 28, as best seen in FIG. 1, are located at both ends of each of the extrusion plates 12 as well as in positions which divide up the recessed areas 26 of the plates. The spacing bosses on upper and lower surfaces of an extrusion plate define the total thickness of that plate. As best seen in FIG. 3, the spacing bosses are effective to separate the individual plates by the required amount and also permit the recessed areas 26 to define the feed channels. As best seen in FIG. 1, those spacing bosses located in the trailing edge zone 24 of the extrusion plate extended generally parallel to the feed channels from the trailing edge zone of the plate to a location spaced rearwardly of the leading edge zone 22 of the plate. The recessed areas 26 may be formed on the trailing edge zone by a photo chemical milling technique known in the art. Pilot openings 30 may also be provided on opposite ends of the extrusion plate for locating purposes.

A plurality of finger slots 32 are formed in the leading edge zone 22 of the extrusion plate 12. These slots extend from the upper surface to the lower surface of each extrusion plate. Individual fingers 34 are formed between the finger slots. In the preferred embodiment these fingers have a square cross-section when viewed looking at the leading edge zone thereof. The finger slots may be formed by an electric discharge machining operation. The fingers formed having a thickness dimension from upper to lower surfaces of the extrusion plate less than the thickness of the spacing bosses 28 provided on the upper and lower surfaces of the extrusion plate whereby a space 36 exists between the fingers 34 of juxtaposed plates as is best seen in FIG. 2.

In the FIG. 2, the spaces 36 extend generally along the horizontal planes between juxtaposed fingers 34 while the finger slots 32 extend generally along the vertical planes between juxtaposed fingers.

Operation

In accordance with a teaching of a preferred embodiment of this invention, the extrusion die 10 of this invention is mounted in an extrusion press, not shown, by mounting structure including a front die support plate 38 (FIG. 4) and a rear die support plate 40 bolted together by suitable fasteners 42. In accordance with the preferred teachings of this invention, the overall die had a width of 6.1 inches and a height of 5.25 inches in the pattern area. The finger slots 32 and spaces 36 have a dimension of 0.015 inches and the finger 34 had a width of 0.070 inches on each side thereof.

A typical composition which is extruded through the die included the following: Georgia Kaolin 36% by weight, Steawhite Talc 12% by weight, Alumina (-100 mesh) 18.7%, Superloid 2.0%, Methocell (4000 CPS) 1.3%, and Water 30.0%. This material is thoroughly blended and aged overnight to achieve complete hydration.

As is well known in the art, the material to be extruded is moved in a direction from the rear die support plate 40 to the front die support plate 38 through the extrusion die 10. In moving in this direction, the material will flow through the recessed areas 26 on the upper and lower surfaces of juxtaposed extrusion plates 12 which define the feed channels. The material flows through the so defined feed channels to the leading edge zone 22 of the extrusion plates. At this point the material is forced through the finger slots 32 and the spaces 36 about the individual fingers 34 to form the final article having a plurality of interconnected walls which define passageways therebetween. The so produced article may be cut into individual sections, dried and subsequently used as a substrate for a catalytic converter.

The die construction of this invention is of value because the structure may be made much cheaper than previous structures because of the use of individual extrusion plates in making up the extrusion die. The extrusion die may also be cleaned more readily and may be repaired more readily because individual plates may be replaced.

There has been disclosed herein an extrusion die. The die construction of this invention will have many apparent modifications when considered by those skilled in the art. It is intended that all such modifications which fall within the true spirit and scope of this invention be included within the appended claims.

We claim:

1. An extrusion die for forming an extruded article having a plurality of interconnected walls which define passageways therebetween, the extrusion die comprising:

a plurality of elongated extrusion plates stacked one upon another; and clamping means for holding the plurality of extrusion plates in a stacked condition;

each of the extrusion plates having on both upper and lower surfaces thereof;

a. a leading edge zone and a trailing edge zone, b. recessed areas on the trailing edge zone, which areas of juxtaposed extrusion plates define material feed channels when the extrusion plates are in a stacked condition, c. spacing bosses located at both ends of the extrusion plate in at least the trailing edge zone, which bosses locate juxtaposed extrusion plates so that the recessed areas of the extrusion plates are spaced apart to define the feed channels, d. finger slots on the leading edge zone the finger slots defining individual fingers therebetween, the so defined fingers of an extrusion plate having a thickness dimension less than the thickness of the spacing bosses on the upper and lower surfaces of the extrusion plate whereby a space exists between the fingers of the juxtaposed extrusion plates;

e. small spacing bosses at various locations in the trailing edge zone to divide up the recessed areas of the extrusion plate, such small spacing bosses extending generally parallel to the feed channels from the trailing edge zone of the extrusion plate to a location spaced rearwardly of the fingers; and wherein f. the recessed areas defining the feed channels are interconnected with the finger slots and the space between juxtaposed fingers when the extrusion plates are in a stacked condition.

* * * * *